US009580591B2

United States Patent
Hashemzadeh

(10) Patent No.: US 9,580,591 B2
(45) Date of Patent: Feb. 28, 2017

(54) USE OF HYBRID COPOLYMERS AS PROTECTIVE COLLOIDS FOR POLYMERS

(71) Applicant: Wacker Chemie AG, Munich (DE)

(72) Inventor: Abdulmajid Hashemzadeh, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 14/651,619

(22) PCT Filed: Dec. 16, 2013

(86) PCT No.: PCT/EP2013/076700
§ 371 (c)(1),
(2) Date: Jun. 11, 2015

(87) PCT Pub. No.: WO2014/095718
PCT Pub. Date: Jun. 26, 2014

(65) Prior Publication Data
US 2015/0315374 A1 Nov. 5, 2015

(30) Foreign Application Priority Data
Dec. 18, 2012 (DE) .................. 10 2012 223 620

(51) Int. Cl.
| | |
|---|---|
| C08L 29/04 | (2006.01) |
| C08L 25/04 | (2006.01) |
| C09D 129/04 | (2006.01) |
| C09D 125/04 | (2006.01) |
| C08F 261/04 | (2006.01) |
| C09J 125/04 | (2006.01) |
| C09J 129/04 | (2006.01) |
| C08L 51/00 | (2006.01) |
| C04B 28/04 | (2006.01) |
| C08K 5/5415 | (2006.01) |

(52) U.S. Cl.
CPC .............. *C08L 29/04* (2013.01); *C04B 28/04* (2013.01); *C08F 261/04* (2013.01); *C08L 25/04* (2013.01); *C08L 51/003* (2013.01); *C09D 125/04* (2013.01); *C09D 129/04* (2013.01); *C09J 125/04* (2013.01); *C09J 129/04* (2013.01); *C08K 5/5415* (2013.01)

(58) Field of Classification Search
CPC .... C08F 261/04; C08F 230/08; C08F 212/08; C08F 226/04; C08F 218/08; C08F 228/02; C08L 51/003; C08L 25/04; C08L 29/04; C09J 125/04; C09J 129/04; C09D 129/04; C09D 125/04; C04B 28/04

USPC ........................................................ 524/503
See application file for complete search history.

(56) References Cited

U.S. PATENT DOCUMENTS

| | | | |
|---|---|---|---|
| 4,532,295 A | 7/1985 | Brabetz et al. | |
| 5,225,478 A | 7/1993 | Beckerle et al. | |
| 5,567,750 A * | 10/1996 | Schulze | C04B 24/26 524/3 |
| 2003/0044611 A1 | 3/2003 | Stark et al. | |
| 2006/0264572 A1 | 11/2006 | Hashemzadeh et al. | |
| 2008/0098933 A1* | 5/2008 | Killat | C04B 24/32 106/638 |
| 2008/0220176 A1 | 9/2008 | Carlblom et al. | |
| 2008/0281035 A1 | 11/2008 | Hashemzadeh et al. | |
| 2011/0201727 A1 | 8/2011 | Hashemzadeh et al. | |
| 2012/0088878 A1* | 4/2012 | Mestach | C08F 283/00 524/457 |
| 2013/0337266 A1 | 12/2013 | Hashemzadeh | |

FOREIGN PATENT DOCUMENTS

| | | |
|---|---|---|
| DE | 101 40 131 B4 | 5/2007 |
| DE | 10 2006 050 336 A1 | 5/2008 |
| DE | 10 2005 054 913 B1 | 11/2008 |
| DE | 10 2007 038 333 A1 | 2/2009 |
| DE | 10 2011 004 361 A1 | 8/2012 |
| EP | 0078449 A2 | 5/1983 |
| EP | 0 134 451 A2 | 3/1985 |
| EP | 0 407 889 A1 | 1/1991 |
| EP | 0 632 096 A1 | 1/1995 |
| EP | 1 724 288 A1 | 11/2006 |
| EP | 1 948 707 B1 | 7/2008 |
| JP | 2005082665 A | 3/2005 |
| JP | 2007077204 A | 3/2007 |
| WO | 2006122705 A1 | 11/2006 |
| WO | 2014069616 A1 | 5/2014 |

OTHER PUBLICATIONS

E.W. Flick, "Water-Soluble Resins—an Industrial Guide," Second Edition, Noyes Publications, Park Ridge, N.J. 1991.
Noll, Chemie and Technologie der Silicone, 2 Auflage 1968, Weinheim (a brief abstract enclosed).
Houben-Weyl, Methoden der organischen Chemie, Band 520, Georg Thieme Verlag, Stuttgart (1987). (brief abstract enclosed).
Fox, T.G. Bull. Am. Physics Soc. (Session J) 1,3, p. 123 (1956).
J. Wiley & Sons, Polymer Handbook, 2nd Edition, New York (1975).

* cited by examiner

Primary Examiner — Michael M Bernshteyn
(74) Attorney, Agent, or Firm — Brooks Kushman P.C.

(57) ABSTRACT

Water-redispersible polymer powders having a high proportion of base polymer are prepared by spray drying a base polymer dispersion, employing as a spraying aid, a hybrid copolymer prepared by polymerizing an ethylenically unsaturated monomer in the presence of a water soluble polymer.

14 Claims, No Drawings

USE OF HYBRID COPOLYMERS AS PROTECTIVE COLLOIDS FOR POLYMERS

CROSS REFERENCE TO RELATED APPLICATIONS

This application is the U.S. National Phase of PCT Appln. No. PCT/EP2013/076700 filed Dec. 16, 2013, which claims priority to German Application No. 10 2012 223 620.1 filed Dec. 18, 2012, the disclosures of which are incorporated in their entirety by reference herein.

BACKGROUND OF THE INVENTION

1. Field of the Invention

The present invention relates to the use of hybrid copolymers as protective colloids for polymers based on ethylenically unsaturated monomers, to protective colloid-stabilized polymers based on ethylenically unsaturated monomers and to the use thereof, for example in the construction materials industry.

2. Description of the Related Art

Protective colloids find a wide variety of uses for the stabilization of polymers, for example in the dispersion of polymers in water. For instance, protective colloids are used as a stabilizing agent in the preparation of polymers during the polymerization of ethylenically unsaturated monomers. Protective colloids are also used as drying aids in the conversion of polymer dispersions to corresponding water-redispersible powders, also referred to as dispersion powders (DPPs). Various demands are made on protective colloid-stabilized systems. For example, systems of this kind should be storage-stable. A particular aim is to modify dispersion powders such that they remain free-flowing (blocking-stable) and water-redispersible even after storage under compressive or thermal stress. For these purposes, relatively large amounts of protective colloids or inert substances have been added to the polymers to date. For instance, EP-A 632096 describes the spray-drying of aqueous vinyl ester polymers in the presence of polyvinyl alcohol as a spray drying colloid. EP-A 78449 discloses conducting spray-drying with the addition of naphthalenesulfonic acid-formaldehyde condensation products. EP-A 407889 describes the spray-drying of aqueous polymer dispersions in the presence or phenolsulfonic acid-formaldehyde condensation products. EP-A 134451 discloses the production of dispersion powders by spray-drying of aqueous dispersions in the presence of starches or proteins.

However, the addition of standard protective colloids to polymers entails a number of disadvantages. Standard protective colloids are costly and additionally have to be used in relatively large amounts in order to assure sufficient storage stability of the polymer dispersions or dispersion powders, especially redispersibility and blocking resistance. However, a relatively high protective colloid content of the polymer compositions leads inevitably to a lower proportion of the base polymers and hence of the component that actually functions as the active ingredient, for example as a binder. Moreover, high protective colloid contents can especially adversely affect the performance properties of the polymer compositions, for example the rheological properties of corresponding polymer dispersions or polymer redispersions.

In an alternative approach for endowing dispersion powders with blocking-resistant properties, the base polymers are coated with inorganic particles, for example silicate particles (Pickering technology)—as described in US20080220176. The dispersion powders thus obtained have satisfactory blocking stability and water resistance, but inadequate redispersibility in water, since the inorganic particles agglomerate as a result of the drying. The redispersing of agglomerated inorganic particles is technically difficult and at least complex. US20080220176 recommends the use of ultrasound for redispersion. In the standard applications, such as in mineral building materials, corresponding dispersion powders lead to adverse performance properties, the compensation of which in turn necessitates the addition of further specific additives.

Against this background, the problem addressed was that of providing measures for stabilizing polymers, with which the abovementioned disadvantages can be overcome. More particularly, polymers were to be made available in the form of water-redispersible powders (dispersion powders) which are blocking-resistant and additionally have good water redispersibility and, if possible, are to be storage-stable in an environment with relatively high air humidity. Finally, correspondingly stabilized polymers, if possible, were to contain smaller amounts of protective colloids than conventionally stabilized polymers.

SUMMARY OF THE INVENTION

The problem was surprisingly solved by the use of hybrid copolymers as protective colloids, which were obtainable by free-radically polymerizing ethylenically unsaturated monomers, especially water-insoluble ethylenically unsaturated monomers, in the presence of conventional protective colloids. In this way, hybrid copolymers formed from conventional protective colloid units and polymer units of the ethylenically unsaturated, preferably water-insoluble monomers are obtained. The different polymer units may be joined to one another chemically, for example via one or more covalent bonds, or else physically, for example via ionic interactions. The covalent bonds may form, for example, through grafting of the conventional protective colloids in the course of the free-radical polymerization of the ethylenically unsaturated monomers. Alternative hybrid copolymers are obtained by condensing silanes or silicon oxides in the presence of the products obtained in the aforementioned free-radical polymerization.

DETAILED DESCRIPTION OF THE PREFERRED EMBODIMENTS

The invention provides for the use of hybrid copolymers as protective colloids for polymers based on ethylenically unsaturated monomers (base polymers), characterized in that the hybrid copolymers are obtainable by A) free-radically initiated polymerization of one or more, preferably water-insoluble, ethylenically unsaturated monomers a) selected from the group comprising vinyl esters of carboxylic acids having 1 to 15 carbon atoms, methacrylates or acrylates of carboxylic acids with unbranched or branched, optionally substituted alcohols having 1 to 15 carbon atoms, methacrylamides or acrylamides of amines with unbranched or branched, optionally substituted amines having 1 to 15 carbon atoms, olefins and dienes, vinylaromatics and vinyl halides and optionally one or more silanes b) selected from the group of the ethylenically unsaturated silanes and mercaptosilanes in the presence of one or more water-soluble polymers c).

Alternative hybrid copolymers are obtainable by condensing, in the presence of one or more products from stage A), one or more silicon compounds of the general formula

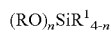  (1) or one or more condensation products of the formula (1) in a further stage B), where R is an optionally substituted alkyl radical, having 1 to 20 carbon atoms, aryl radical, or hydrogen, $R^1$ is an optionally substituted hydrocarbyl radical or hydrogen, and n assumes a value from 1 to 4.

The invention further provides protective colloid-stabilized polymers based on ethylenically unsaturated monomers (base polymers), characterized in that one or more protective colloids are the aforementioned hybrid copolymers, wherein, for the preparation of the hybrid copolymers in stage A), 20% to 95% by weight, preferably 25% to 90% by weight and more preferably 30% to 80% by weight of water-soluble polymers c) are used, based on the total weight of the amounts of water-soluble polymers c) and ethylenically unsaturated monomers a) used in the polymerization in stage A).

In the course of preparation of the hybrid copolymers, the monomer units of the monomers a) and optionally silanes b) and optionally the silicon compounds of the formula (1) or optionally condensation products of the silicon compounds of the formula (1) are fixed to the water-soluble polymers c). Chemical fixing is effected here generally by grafting the water-soluble polymers c) with the monomers a) and any silanes b), or by the condensation in stage B). The condensation preferably gives rise to chains composed of Si—O repeat units which are finally bonded via covalent bonds to the water-soluble polymers c). Alternatively, the condensation products formed or used in stage B), based on silicon compounds of the formula (1), may also be fixed to the polymer units composed of the monomers a) and any silanes b). This fixing is particularly marked when silanes b) are used in stage A). A physical interaction is generally based on ionic interactions, especially when ionic monomers a) or ionic water-soluble polymers c) are used, such as cationic water-soluble polymers c) and the condensation products based on silicon compounds of the formula (1). As a result of the preparation thereof, the hybrid copolymers are thus not mere blends formed from the water-soluble polymers c) and polymers composed of the monomers a) and any silanes b) or any condensation products from stage B).

The monomers a) are preferably water-insoluble ethylenically unsaturated monomers. The water-insoluble ethylenically unsaturated monomers a) generally have a solubility in water of ≤40 g/l and preferably 25 g/l under standard conditions to DIN50014. In the case of liquid monomers a), "water-insoluble" should be understood to mean that water and monomers a) form a biphasic liquid mixture under standard conditions according to DIN50014. The monomers a) are also characterized in that homopolymers of monomers a) have a solubility in water of <10 g/l, more preferably <5 g/l and most preferably <1 g/l under standard conditions according to DIN50014.

Vinyl esters preferred among the monomers a) are vinyl acetate, vinyl propionate, vinyl butyrate, vinyl 2-ethylhexanoate, vinyl laurate, 1-methylvinyl acetate, vinyl pivalate and vinyl esters von alpha-branched monocarboxylic acids having 5 to 13 carbon atoms, for example VeoVa9R or VeoVa10R (trade names of Shell). Particular preference is given to vinyl acetate.

Preferred methacrylates or acrylates are esters of unbranched or branched alcohols having 1 to 15 carbon atoms, such as methyl acrylate, methyl methacrylate, ethyl acrylate, ethyl methacrylate, propyl acrylate, propyl methacrylate, butyl acrylate, butyl methacrylate, 2-ethylhexyl acrylate, norbornyl acrylate, lauryl acrylate, lauryl methacrylate, stearyl acrylate, stearyl methacrylate, 2-propylheptyl acrylate, isotridecyl methacrylate or dihydrodicyclopentadienyl acrylate. Particular preference is given to methyl acrylate, methyl methacrylate, butyl acrylate, butyl methacrylate and 2-ethylhexyl acrylate.

Preferred olefins or dienes are ethylene, propylene and 1,3-butadiene. Preferred vinylaromatics are styrene, methylstyrene and vinyltoluene. A preferred vinyl halide is vinyl chloride.

Most preferred monomers a) are selected from the group comprising vinyl acetate, vinyl esters of alpha-branched monocarboxylic acids having 5 to 13 carbon atoms, methyl acrylate, methyl methacrylate, butyl acrylate, butyl methacrylate, styrene, methylstyrene, ethylene, vinyl chloride and butadiene. The very most preferred are styrene, methylstyrene, butyl acrylate, methyl methacrylate, ethylhexyl acrylate, VeoVa5R, VeoVa6R, VeoVa7R, VeoVa8R, VeoVa9R, VeoVa10R and VeoVa11R.

For applications of hybrid copolymer-stabilized base polymers in the construction sector, especially in mineral building materials, preferred monomers a) are styrene and/or (meth)acrylic esters such as butyl acrylate. For applications in adhesives, paper coating compositions or for fiber binding, preferred monomers a) are vinyl acetate and the aforementioned (meth)acrylic esters.

In addition to or as an alternative to the water-insoluble monomers a), preferred monomers a) are also ethylenically unsaturated cationic monomers, such as ethylenically unsaturated ammonium compounds or ethylenically unsaturated tertiary amine compounds. Ethylenically unsaturated groups borne by the cationic monomers a) are preferably one or more olefin groups, such as allyl or vinyl groups, acryloyl groups or methacryloyl groups. Ethylenically unsaturated cationic monomers may, for example, be selected from the group comprising allylalkylammonium halides, (meth)acryloyloxyalkylammonium halides, (meth)acrylamidoalkylammonium halides, aminoalkyl(meth)acrylate and aminoalkyl (meth)acrylamide, where the alkyl radicals may contain 1 to 20 carbon atoms, especially 1 to 4 carbon atoms, and also optionally substituted heteroaromatics bearing vinyl groups and containing a nitrogen atom. Examples of corresponding heteroaromatics are imidazole or pyridine.

Ethylenically unsaturated tertiary amine compounds are preferably selected from the group comprising 2-dimethylamino-ethyl methacrylate and 3-dimethylaminopropylmethacrylamide (DMAEMA or DMAPMA are protonated species at pH 5), and also N-(1,1-dimethyl-3-dimethylaminopropyl)acrylamide, N-(1,1-dimethyl-3-dimethylaminobutyl)acrylamide, N-(1-methyl-1,3-diphenyl-3-diethylaminopropyl)methacrylamide, 1-vinylimidazole, 1-vinyl-2-methylimidazole, 1-vinyl-2-ethylimidazole, 1-vinyl-2-phenylimidazole, 1-vinyl-2,3-dimethylimidazole and 1-vinyl-2,4,5-trimethylimidazole.

Preferred ethylenically unsaturated ammonium compounds are selected from the group comprising diallyldiethylammonium chloride (DADEAC), (3-methacryloyloxy)propyltrimethylammonium chloride (MPTAC),(3-methacryloyloxy)ethyltrimethylammonium chloride (METAC), (3-methacrylamido)propyltrimethylammonium chloride (MAPTAC), trimethyl-3-(1-acrylamido-1,1-dimethyl-propyl)ammonium chloride, trimethyl-3-(1-acrylamido-1,1-dimethylbutyl)ammonium chloride, dimethylacrylamidopropyl-4-trimethylammoniumbutenyl-2-ammonium chloride, 2-acrylamido-methoxy)

ethyltrimethylammonium chloride and especially diallyldimethylammonium chloride (DADMAC).

Preferred ethylenically unsaturated ammonium compounds also include those ethylenically unsaturated cationic monomers which are obtained by quaternizing a nitrogen atom of an ethylenically unsaturated tertiary amine compound. Quaternization can be effected with one or more quaternizing agents, such as alkyl halides, dimethyl sulfate, methyl p-tolylsulfonate.

Particularly preferred cationic monomers a) are diallyldimethylammonium chloride (DADMAC), diallyldiethylammonium chloride (DADEAC), (3-methacryloyloxy)propyltrimethylammonium chloride (MPTAC), (3-methacryloyloxy)ethyltrimethylammonium chloride (METAC) and (3-methacrylamido)propyltrimethyl-ammonium chloride (MAPTAC).

Monomers a) used may also be one or more water-insoluble monomers and one or more cationic monomers. Among the monomers a), however, preference is given to the water-insoluble monomers. It is thus preferable to use, as monomers a), exclusively water-insoluble monomers, or no cationic monomers.

For clarification, it should be mentioned that the monomers a) preferably differ from the silanes b) mentioned hereinafter and/or especially the auxiliary monomers listed below.

For preparation of the hybrid copolymers, in stage A), preferably 5% to 80% by weight, more preferably 5% to 75% by weight and most preferably 10% to 75% by weight of monomers a) are used, based on the total weight of the amounts of water-soluble polymers c) and ethylenically unsaturated monomers a) used overall in the polymerization in stage A) for preparation of the hybrid copolymers.

Suitable silanes b) are, for example, ethylenically unsaturated silicon compounds of the general formula

  (2) where $R^2$ are as $C_1$- to $C_3$-alkyl radicals, $C_1$- to $C_3$-alkoxy radical or halogen (for example Cl or Br), $R^3$ are as $CH_2=CR^5-(CH_2)_{0-1}$ or $CH_2=CR^5CO_2(CH_2)_{1-3}$, $R^4$ are unbranched or branched, optionally substituted alkyl radicals having 1 to 12 carbon atoms, preferably 1 to 3 carbon atoms, or an acyl radical having 2 to 12 carbon atoms, where $R^4$ may optionally be interrupted by an ether group, and $R^5$ is H or $CH_3$.

Preferred silanes b) are γ-acryloyl- or γ-methacryloyloxypropyltri(alkoxy)silanes, α-methacryloyloxymethyltri(alkoxy)-silanes, γ-methacryloyloxypropylmethyldi(alkoxy)silanes, vinylalkyldi(alkoxy)silanes and vinyltri(alkoxy)silanes, where the alkoxy groups used may, for example, be methoxy, ethoxy, methoxyethylene, ethoxyethylene, methoxy propylene glycol ether or ethoxy propylene glycol ether radicals. Examples of suitable silicon compounds are vinyltrimethoxysilane, vinylmethyldimethoxysilane, vinyltriethoxysilane, vinylmethyl-diethoxysilane, vinyltripropoxysilane, vinyltriisopropoxy-silane, vinyltris(1-methoxy)isopropoxysilane, vinyltributoxysilane, vinyltriacetoxysilane, 3-methacryloyloxypropyltrimethoxysilane, 3-methacryloyloxypropylmethyldimethoxysilane, methacryloyloxymethyltrimethoxysilane, 3-methacryloyloxypropyltris(2-methoxyethoxy)silane, vinyltrichlorosilane, vinylmethyldichlorosilane, vinyltris(2-methoxyethoxy)silane, trisacetoxyvinylsilane, allylvinyltrimethoxysilane, allyltriacetoxysilane, vinyldimethylmethoxysilane, vinyldimethylethoxysilane, vinylmethyldiacetoxysilane, vinyldimethylacetoxysilane, vinylisobutyldimethoxysilane, vinyltriisopropyloxysilane, vinyltributoxysilane, vinyltrihexyloxysilane, vinylmethoxydihexyloxysilane, vinyltrioctyloxysilane, vinyldimethoxyoctyloxysilane, vinylmethoxydioctyloxysilane, vinylmethoxydilauryloxysilane, vinyldimethoxylauryloxysilane, and also polyethylene glycol-modified silanes.

Examples of mercaptosilanes are 3-mercaptopropyltrimethoxysilane, 3-mercaptopropyltriethoxysilane and 3-mercaptopropylmethyldimethoxysilane.

Most preferred silanes b) are vinyltrimethoxysilane, vinylmethyldimethoxysilane, vinyltriethoxysilane, vinylmethyldiethoxysilane, vinyltris(1-methoxy)isopropoxysilane, methacryloyloxypropyltris(2-methoxyethoxy)silane, 3-methacryloyloxypropyltrimethoxysilane, 3-methacryloyloxypropylmethyldimethoxysilane and methacryloyloxymethyltrimethoxysilane and mixtures thereof, especially mixtures of 2, or more silanes from the group comprising 3-methacryloyloxypropyltrimethoxysilane or methacryloyloxymethyltrimethoxysilane with vinyltrimethoxysilane and vinyltriethoxysilane.

Silanes b) are preferably used in stage A) to an extent of 0% to 10% by weight, more preferably 0.1% to 7% by weight and most preferably 1% to 5% by weight, based on the total weight of the amounts of water-soluble polymers c), ethylenically unsaturated monomers a) and silanes b) used overall in the polymerization in stage A) for preparation of the hybrid copolymers.

In addition, it is optionally possible to copolymerize one or auxiliary monomers. Examples of auxiliary monomers are ethylenically unsaturated mono- and dicarboxylic acids, preferably acrylic acid, methacrylic acid, fumaric acid and maleic acid; ethylenically unsaturated carbonitriles, preferably acrylonitrile; mono- and diesters of fumaric acid and maleic acid, such as the diethyl and diisopropyl esters, and also maleic anhydride, ethylenically unsaturated sulfonic acids or salts thereof, preferably vinylsulfonic acid, 2-acrylamido-2-methylpropanesulfonic acid. Further examples are precrosslinking comonomers such as polyethylenically unsaturated comonomers, for example diallyl phthalate, divinyl adipate, diallyl maleate, allyl methacrylate or triallyl cyanurate, or postcrosslinking comonomers, for example acrylamidoglycolic acid (AGA), methyl methylacrylamidoglycolate (MAGME), N-methylolacrylamide (NMA), N-methylolmethacrylamide, N-methylolallyl carbamate, alkyl ethers such as the isobutoxy ether or ester of N-methylolacrylamide, of N-methylolmethacrylamide and of N-methylolallyl carbamate. Also suitable are epoxy-functional comonomers such as glycidyl methacrylate and glycidyl acrylate. Additionally suitable are hydroxypropyl carbamate acrylates, amine acrylates or amine methacrylates, unsaturated fatty acid acrylates or glycol acrylates, such as ethyldiglycol acrylate. Further examples are monomers having hydroxyl or CO groups, for example hydroxyalkyl methacrylates and hydroxyalkyl acrylates, such as hydroxyethyl acrylate or methacrylate, hydroxypropyl acrylate or methacrylate or hydroxybutyl acrylate or methacrylate, hydroxyethylcaprolactone acrylates and compounds such as diacetoneacrylamide or acetylacetoxyethyl acrylate or methacrylate.

Auxiliary monomers may optionally be copolymerized to an extent of 0.1% to 30% by weight, preferably to an extent of 0.1% to 15% by weight, more preferably to an extent of 0.1% to 10% by weight and most preferably to an extent of 0.1% to 5% by weight, based on the total weight of the ethylenically unsaturated monomers a) and optionally b) and optionally the silicon compounds of the formula (1) and/or the condensation products of the silicon compounds of the formula (1). In a preferred alternative, no auxiliary monomers are copolymerized.

The water-soluble polymers c) generally have a solubility of at least 10 g/l in water at a temperature between 20° C. and 90° C. and a pH between 3 and 12, especially at a pH between 3 and 9.

The water-soluble polymers c) may be conventional protective colloids. Examples of suitable water-soluble polymers c) are polymers containing units of vinyl alcohol, vinylpyrrolidones, vinyl acetals, ethylenically unsaturated carboxylic acids, acrylamides, vinylsulfonic acids, ethylenically unsaturated amines or ammonium compounds or else polymers such as polysaccharides in water-soluble form, proteins, lignosulfonates or formaldehydesulfonates.

Preferred water-soluble polymers c) are polyvinyl alcohols; polyvinyl acetals; polyvinylpyrrolidones; polysaccharides in water-soluble form, such as starches (amylose and amylopectin), celluloses and the carboxymethyl, methyl, hydroxyethyl and hydroxypropyl derivatives thereof, dextrins and cyclodextrins; proteins such as casein or caseinate, soya protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids and the water-soluble copolymers thereof; melamine formaldehydesulfonates, naphthalene formaldehydesulfonates, cresol formaldehydesulfonates, styrene-maleic acid and vinyl ether-maleic acid copolymers.

Preferred polyvinyl alcohols are also hydrophobically modified polyvinyl alcohols, for example hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 11 carbon atoms, dialkyl maleates and dialkyl fumarates such as diisopropyl maleate and diisopropyl fumarate, vinyl chloride, vinyl alkyl ethers such as vinyl butyl ether, olefins such as ethene and decene. The proportion of the hydrophobic units is preferably 0.1% to 10% by weight, based on the total weight of the hydrophobically modified polyvinyl alcohol.

The polyvinyl alcohols may also be cationic polyvinyl alcohols or anionic polyvinyl alcohols. Cationic protective colloids are polymers having cationic charge; anionic protective colloids are polymers having anionic charge.

Examples of cationic polyvinyl alcohols are polymers containing cationic monomer units, preferably monomer units having quaternary ammonium groups, sulfonium groups and phosphonium groups. Preference is given to hydrolyzed copolymers of vinyl acetate with one or more cationic comonomers selected from the group comprising allylalkylammonium halides, (meth)acryloyloxyalkylammonium halides, (meth)acrylamidoalkylammonium halides, aminoalkyl(meth)acrylate and aminoalkyl(meth)acrylamide, where the alkyl radicals may contain 1 to 4 carbon atoms. Preferred cationic comonomers are selected from the group comprising diallyldiethylammonium chloride (DADEAC), (3-methacryloyloxy)propyltrimethylammonium chloride (MPTAC), (3-methacryloyloxy)ethyltrimethylammonium chloride (METAC), (3-methacrylamido)propyltrimethylammonium chloride (MAPTAC), 2-dimethylaminoethyl methacrylate or 3-dimethylaminopropyl-methacrylamide (DMAEMA or DMAPMA are protonated species at pH 5) and especially diallyldimethylammonium chloride (DADMAC). Most preferred monomers c) are diallyldimethyl-ammonium chloride (DADMAC), diallyldiethylammonium chloride (DADEAC), (3-methacryloyloxy)propyltrimethylammonium chloride (MPTAC), (3-methacryloyloxy)ethyltrimethylammonium chloride (METAC), (3-methacrylamido)propyltrimethylammonium chloride (MAPTAC). The preparation of cationic polyvinyl alcohols is described, for example, in EP1724288A1 or in E. W. Flick, Water-Soluble Resins—an Industrial Guide, Noyes Publications, Park Ridge, N.J., 1991.

The proportion of the cationic comonomers is preferably 0.01% to 30% by weight, more preferably 1% to 15% by weight, even more preferably 1% to 10% by weight and most preferably 1% to 5% by weight, based in each case on the total weight of the cationic polyvinyl alcohols.

Examples of anionic polyvinyl alcohols are polymers containing anionic monomer units, preferably monomer units having sulfate, sulfonic acid, phosphate, phosphonate and carboxylic acid groups or the respective salts thereof. Particularly preferred anionic monomer units bear phosphate, phosphonate or especially sulfonic acid or carboxylic acid groups. Preference is given to hydrolyzed copolymers of vinyl acetate with one or more anionic comonomers selected from the group comprising vinyl sulfonates, allyl sulfonates, ethylenically unsaturated mono- or dicarboxylic acids, monoesters of fumaric acid and maleic acid. Particular preference is given to vinyl sulfonates and ethylenically unsaturated mono- or dicarboxylic acids. Especially preferred are vinyl sulfonate, 2-methyl-2-propene-1-sulfonic acid, allyl sulfonate, acrylic acid, methacrylic acid, fumaric acid, maleic acid, monoethyl or monoisopropyl esters of fumaric acid or of maleic acid, or the salts of the aforementioned acids. Most preferred is vinyl sulfonate. The preparation of anionic polyvinyl alcohols is described, for example, in WO06122705A.

The proportion of the anionic comonomers is preferably 0.01% to 30% by weight, more preferably 1% to 20% by weight, even more preferably 1% to 15% by weight and most preferably 1% to 10% by weight, based in each case on the total weight of the anionic polyvinyl alcohols.

Preference is given to partly hydrolyzed or fully hydrolyzed polyvinyl alcohols having a hydrolysis level of 80 to 100 mol %, especially partly hydrolyzed polyvinyl alcohols having a hydrolysis level of 80 to 95 mol %. The hydrolysis level refers to the molar ratio of the vinyl alcohol units and the sum total of the vinyl alcohol and vinyl esters units of the respective water-soluble polymer c).

The polyvinyl alcohols preferably have a Höppler viscosity of 0.4 to 30 mPas, more preferably 0.4 to 15 mPas, even more preferably 0.5 to 10 mPas and most preferably of 0.8 to 6 mPas (determined by the Höppler method at 20° C. to DIN 53015 in 4% aqueous solution).

Polyvinyl acetals are obtainable by partial or full acetalization of the partly or fully hydrolyzed polyvinyl alcohols. The polyvinyl acetals are prepared by standard methods, by acetalizing the polyvinyl alcohols mentioned with aldehydes, as described, for example, in DE-A 10140131. Preference is given to aldehydes from the group of the aliphatic aldehydes having 1, to 15, carbon atoms, especially formaldehyde, acetaldehyde, propionaldehyde and most preferably butyraldehyde or a mixture of butyraldehyde and acetaldehyde. Aromatic aldehydes used may, for example, be benzaldehyde or derivatives thereof. The acetalization level of the polyvinyl acetals can be adjusted via the amount of aldehyde used. This is because, since the acetalization proceeds with almost complete conversion, the amount added can be determined by simple stoichiometric calculation.

Particularly preferred water-soluble polymers c) are polyvinyl alcohols, especially also cationic polyvinyl alcohols or anionic polyvinyl alcohols.

Preference is also given to the use of mixtures of at least two water-soluble polymers c), especially at least two polyvinyl alcohols. Preferred mixtures of polyvinyl alcohols contain one or more high-viscosity polyvinyl alcohols having a Höpler viscosity of preferably greater than 8 to 30 mPas, more preferably greater than 8 to 20 mPas and most preferably of greater than 8 to 16 mPas, and one or more low-viscosity polyvinyl alcohols having a Höpler viscosity of preferably 1 to ≤8 mPas and more preferably 2 to 6 mPas (each determined by the Höpler method at 20° C. to DIN 53015 in 4% aqueous solution). Mixtures of polyvinyl alcohols preferably contain 2% to 50% by weight of high-viscosity polyvinyl alcohols and 50% to 98% by weight of low-viscosity polyvinyl alcohols, based on the dry weight of the mixture of the polyvinyl alcohols. Mixtures of polymers c) can be used to improve the processibility of use formulations containing hybrid copolymer-stabilized base polymers.

The water-soluble polymers c) are used in stage A) to an extent of preferably 20% to 95% by weight, more preferably 25% to 95% by weight and most preferably 25% to 90% by weight, based on the total weight of the water-soluble polymers c) and ethylenically unsaturated monomers a) used overall in the polymerization in stage A) for preparation of the hybrid copolymers.

The silicon compounds of the formula (1) used in stage B) preferably bear unsubstituted radicals as R radicals. More preferably, the R radical of the formula (1) is methyl, ethyl or propyl, cyclohexyl, phenyl, most preferably methyl or ethyl.

Preferably, the $R^1$ radical is an alkyl or aryl radical, more preferably methyl, ethyl, propyl, cyclohexyl, isooctyl or phenyl and most preferably methyl or ethyl.

Preferably, n assumes a value of 2 to 4, more preferably the value of 3 or 4.

Examples of silanes of the formula (1) are tetramethoxysilane, tetraethoxysilane, methyltrimethoxysilane, methyltriethoxysilane, dimethyldimethoxysilane, dimethyldiethoxysilane, isooctyltrimethoxysilane, isooctyltriethoxysilane, (cyclohexyl)methyldimethoxysilane, dicyclopentyldimethoxysilane or phenyltriethoxysilane. Preferred silanes of the formula (1) are tetramethoxysilane, tetraethoxysilane, methyltrimethoxysilane, methyltriethoxysilane, isooctyltrimethoxysilane, isooctyltriethoxysilane or phenyltriethoxysilane. Particular preference is given to tetramethoxysilane, tetraethoxysilane, methyltrimethoxysilane, methyltriethoxysilane. Most preferred are tetramethoxysilane and tetraethoxysilane.

The condensation products of silicon compounds of the formula (1) are preferably organopolysiloxanes formed from units of the general formula

$$R^1_x Si(OR)_y O_{(4-x-y)/2} \quad (3) \text{ in which}$$

x is 0, 1, 2, or 3 and y is 0, 1 or 2,
with the proviso that the sum total x+y≤3,
$R^1$ may be the same or different and may assume the definitions given above for the formula (1), and
R may be the same or different and may assume the definitions given above for the formula (1).

Preferred, more preferred and most preferred R and $R^1$ radicals are the same which have been listed correspondingly above for the formula (1).

The use of silicon compounds of the formula (1) or (3) having one or more $R^1$ radicals is particularly suitable for endowing the hybrid copolymers or the base polymers stabilized with hybrid copolymers or the application products thereof additionally with hydrophobic properties. For this reason, particular preference is given especially to the use of isooctyltrimethoxysilane, isooctyltriethoxysilane, (cyclohexyl)methyldimethoxysilane, dicyclopentyldimethoxysilane or phenyltriethoxysilane. The proportion of the silicon compounds of the formula (1) and/or (3) containing one or more $R^1$ radicals is preferably 0% to 10% by weight, more preferably 0.1% to 10% by weight and most preferably 1% to 3% by weight, based in each case on the total mass of the silicon compounds of the formulae (1) and (3) used overall.

The silicon compounds of the formulae (1) and (3) are commercial products or are preparable by standard methods, as described, for example, in Noll, Chemie and Technologie der Silikone [Chemistry and Technology of the Silicones], second edition 1968,, Weinheim, or in Houben-Weyl, Methoden der organischen Chemie [Methods of Organic Chemistry], volume E20, Georg Thieme Verlag, Stuttgart (1987).

In the condensation in stage B), preferably 0.1% to 20% by weight, more preferably 1% to 17% by weight and most preferably 5% to 15% by weight of silicon compounds of the formulae (1) and/or (3) is used, based on the dry weight of the hybrid copolymers of stage B).

The hybrid copolymers of stage B) are based preferably on 20% to 70% by weight, more preferably 30% to 60% by weight and most preferably 35% to 50% by weight of water-soluble polymers c). The total amount of silicon compounds of the formulae (1) and/or (3) and monomers a) and also optionally silanes b) is preferably 30% to 80% by weight, more preferably 40% to 70% by weight and most preferably 50% to 65% by weight.

The figures in % by weight are based in each case on the dry mass of the hybrid copolymers which are obtained in stage B). Silicon compounds of the formulae (1) and/or (3) are used in stage B) to an extent of preferably 5% to 40% by weight, more preferably 10% to 30% by weight and most preferably 15% to 30% by weight. The hybrid copolymers of stage B) are based preferably on preferably 50% to 90% by weight, more preferably 60% to 85% by weight and most preferably 70% to 80% by weight of monomers a). The figures in % by weight are based here on the silicon compounds of the formulae (1) and (3) and the monomers a) and any silanes b).

In the hybrid copolymers, the polymer units have, based on the monomers a), any silanes b) and any auxiliary monomers, and also any silicon compounds of the formulae (1) and/or (3), mean particle sizes of preferably 10 nm to 200 nm, more preferably of 30 nm to 150 nm and most preferably of 40 nm to 100 nm (determination by means of Beckmann Coulter).

The hybrid copolymers of stage B) surprisingly have a particularly high thermal stability. The use of the hybrid copolymers of stage B) as protective colloids for the base polymers is particularly suitable, especially in the case of use thereof in mineral building materials. This affords particularly stable and durable building material products.

The hybrid copolymers of stage A) can be prepared, for example, by means of emulsion polymerization of one or more ethylenically unsaturated monomers a) and optionally one or more silanes b) in the presence of one or more water-soluble polymers c). Thus, there is preferably no suspension polymerization. The polymerization temperature is preferably between 40° C. and 100° C., more preferably between 60° C. and 90° C. In the case of copolymerization of gaseous comonomers such as ethylene, 1,3-butadiene or vinyl chloride, it is also possible to work under pressure, generally between 5 bar and 100 bar.

The polymerization is typically effected in water, optionally in a mixture with one or more organic solvents, such as alcohols having 1 to 7 carbon atoms. Examples of alcohols are methanol, ethanol, propanol, butanol or pentanol. Preferably, the proportion of water, based on the total weight of the organic solvents and water, is ≥50% by weight, more preferably ≥90% by weight and most preferably 100% by weight.

The polymerization can be initiated using the water-soluble or monomer-soluble initiators or redox initiator combinations commonly used for the emulsion polymerization; preference is given to avoiding redox initiator combinations. Examples of water-soluble initiators are hydrogen peroxide, t-butyl peroxide, t-butyl hydroperoxide, potassium peroxodiphosphate, tert-butyl peroxopivalate, cumene hydroperoxide, isopropyl-benzene monohydroperoxide, azobisisobutyronitrile. Examples of monomer-soluble initiators are dicetyl peroxydicarbonate, dicyclohexyl peroxydicarbonate, dibenzoyl peroxide or preferably alkali metal/alkaline earth metal or ammonium salts, such as sodium, potassium and ammonium salts, of peroxodisulfuric acid. The salts of peroxodisulfuric acid in particular ultimately lead to base dispersions or powders thereof having particularly high storage stability or redispersibility.

The concentration of the water-soluble polymers c) is preferably 25 to 95, more preferably 30 to 90 and most preferably 30 to 80% by weight, based in each case on the total weight of the water-soluble polymers c), the water-insoluble monomers a) and any silanes b). These concentrations lead to particularly stable hybrid copolymers or particularly stable hybrid copolymer-stabilized polymers, especially in the case of aqueous dispersions or redispersions.

The initiators mentioned are generally used in an amount of 0.1% to 5.0% by weight, preferably 0.2% to 2.0% by weight, based in each case on the total weight of the monomers.

Preferably 20%, especially preferably ≥30%, more preferably ≥40% and even more preferably ≥50% of the initiators are initially charged, based on the total weight of the initiators used in stage A). During the polymerization, preferably ≤80%, more preferably ≤60% and even more preferably 10% of initiators are metered in, based on the total weight of the initiators used in stage A). Most preferably, no initiators are metered in during the polymerization. On completion of addition of the monomers, however, additional amounts of initiators can be added for further polymerization.

Redox initiators used are combinations of the initiators mentioned and reducing agents. Suitable reducing agents are the sulfites and bisulfites of the alkali metals and of ammonium, for example sodium sulfite, the derivatives of sulfoxylic acid such as zinc formaldehydesulfoxylates or alkali metal formaldehydesulfoxylates, for example sodium hydroxymethanesulfinate, and ascorbic acid. The amount of reducing agent is generally 0.001% to 0.03% by weight, preferably 0.001% to 0.015% by weight, based in each case on the total weight of the monomers.

The water-soluble polymers c) may be wholly or partly metered in or preferably initially charged in full. Preferably at least 50% by weight, more preferably at least 60% by weight and most preferably at least 80% by weight of the water-soluble polymers c) are initially charged, based in each case on the amount of water-soluble polymers c) used overall.

Preferably ≥50% by weight, more preferably ≥60% by weight, even more preferably ≥70% by weight and most preferably ≥80% by weight of the amount of water-soluble polymers c) used overall has been initially charged or metered in at a juncture at which ≤60% by weight, preferably ≤50% by weight, more preferably ≤40% by weight and most preferably ≤30% by weight of the amounts of ethylenically unsaturated monomers a) and silanes b) used overall have been initially charged or metered in.

The monomers a) and the silanes b) can be initially charged in their entirety or preferably metered in full. The procedure is preferably to initially charge 0% to 20% by weight, especially 0% to 10% by weight, based on the total weight, of the monomers a) and the silanes b) and to meter in the remaining residual amount of monomers a) and silanes b) at a later juncture during the polymerization. The metered additions can be conducted separately (in terms of place and time).

The silanes b) are preferably metered in wholly or partly when up to 80% by weight, especially 30% to 70% by weight, of the water-insoluble monomers a) have been initially charged or metered in, based on the total weight of the water-soluble monomers a) used overall in stage A). It is thus possible, for example, to increase the binding power and the mechanical strength of inventive use products.

The preferred metered additions or initial charging of components a), b) or especially c) are particularly appropriate to the purpose of bringing about a particularly strong and additionally uniform or homogeneous linkage of the different constituents of the hybrid copolymers.

During the polymerization, emulsifiers may additionally be present. If the polymerization is conducted in the presence of emulsifiers, the amount thereof is preferably 1% to 5% by weight, based on the weight of the monomers a) and b). Preference is given to polymerizing in the absence of emulsifiers. Examples of emulsifiers are anionic, cationic, amphoteric, polymerizable or nonionic emulsifiers, such as anionic surfactants, especially alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl- or alkylarylsulfonates having 8 to 18 carbon atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units.

To control the molecular weight and/or the viscosity, it is possible to use chain transfer agents during the polymerization. If chain transfer agents are used, they are used typically in amounts between 0.01% and 5.0% by weight, based on the monomers a) and optionally b) to be polymerized, and are metered in separately or else in a premixture with reaction components. Examples of such substances are n-dodecyl mercaptan, tert-dodecyl mercaptan, mercaptopropionic acid, methyl mercaptopropionate, isopropanol and acetaldehyde.

The pH of the dispersions thus obtained is preferably 2 to 10, more preferably 4 to 7 and most preferably 4 to 6.

The condensation of stage B) for preparation of hybrid copolymers is preferably effected in the same solvent in which stage A) was executed, i.e. especially in water as the sole solvent.

The silicon compounds of the formulae (1) and (3) or the products of stage A) can be used in pure form or more preferably in water. The products of stage A) can be initially charged in water and the silicon compounds of the formulae (1) and (3) can be added in pure form wholly or partly during the condensation. Alternatively, a portion of the silicon compounds of the formulae (1), (3) or of the products of stage A) can be initially charged for the condensation, and the remaining residue of the silicon compounds of the formulae (1), (3) or of the products of stage A) can be added during the condensation.

Preferably, the silicon compounds of the formulae (1) and (3) and the products of stage A) can be initially charged in their entirety in water for the condensation.

The temperature during the condensation is, for example, 10 to 100° C., preferably 20 to 80° C., more preferably 30 to 70° C. and most preferably 40 to 60° C. The condensation is preferably effected at ambient pressure, i.e. around 1 atm. The reaction time for the condensation is preferably 1 to 19 hours, more preferably 2 to 7 hours. The pH during the condensation is preferably ≥5, preferably between 6 and 11 and more preferably between 7 and 10. The pH can be adjusted with the standard organic and inorganic acids, bases or buffers.

The condensation preferably results in self-condensation of silicon compounds of the formula (1) or the condensation products thereof to form Si—O—Si bonds. In addition, there is preferably fixing, especially condensation, of the products of stage A) with silicon compounds of the formulae (1) and/or (3) or with the condensation products thereof.

Volatile by-products of stages A) and B) can be removed by means of distillation, preferably under reduced pressure, and optionally while passing inert entraining gases through or over, such as air, nitrogen or steam. Directly after the polymerization, residual monomer removal when employing known methods can also be effected by further polymerization, generally by further polymerization initiated with redox catalyst.

The hybrid copolymers of stages A) and/or B) thus obtainable have a solids content in water of preferably ≤40%, more preferably 10% to 35%, even more preferably 15% to 30% and most preferably 18% to 25%. Said upper limit is particularly advantageous for obtaining particularly stable hybrid copolymer-stabilized base polymers that do not have a tendency to gel.

For preparation of hybrid copolymers having a solids content in water of 15% to 25% by weight, especially of 18% to 22% by weight, water-soluble polymers c) having a Höpler viscosity of preferably 0.4 to less than 10 mPas and more preferably 0.5 to 10 mPas are used. For preparation of hybrid copolymers having a solids content in water of <15% by weight, such as 5% to 15% by weight, especially 5% to 10% by weight, water-soluble polymers c) having a Höpler viscosity of preferably ≥10 mPas, more preferably 10 to 30 mPas and most preferably 11 to 20 mPas are used in the polymerization. The Höpler viscosity is determined here in each case by the method according to DIN 53015 at 20° C. in 4% aqueous solution.

The hybrid copolymers can be converted to solids, especially to water-redispersible powders. For this purpose, it is possible to dry aqueous dispersions of the hybrid copolymers, preferably without addition of drying aids, i.e. preferably without addition of the abovementioned water-soluble polymers after performance of stage A or B, for example by means of fluidized bed drying, freeze-drying or spray-drying. Preference is given to spray-drying the dispersions. The spray-drying is effected here in standard spray-drying systems, and the atomization can be effected by means of one-phase, two-phase or multiphase nozzles or with a rotating disk. The exit temperature is generally chosen within the range from 45° C. to 120° C., preferably 60° C. to 90° C.

To increase the storability by improving the blocking resistance, the powder obtained may be modified with antiblocking agents (anticaking agents). Preferably, the hybrid copolymers in the form of powders contain 2% to 10% by weight of antiblocking agents, based on the dry weight of the hybrid copolymers. However, particular preference is given to dispensing with the addition of antiblocking agents. Examples of antiblocking agents are calcium carbonate or magnesium carbonate, talc, gypsum, silica, kaolins, meta-kaolin, calcined kaolin, silicates having particle sizes preferably in the range from 10 nm to 100 μm.

The base polymers are based on one or more ethylenically unsaturated monomers, for example selected from the group comprising the abovementioned monomers a), b) and the auxiliary monomers, with preference, more preference and most preference being given to the same monomers specified above.

Examples of homo- or copolymers suitable as base polymers are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, and styrene-1,3-butadiene copolymers.

Preference is given to vinyl acetate homopolymers; copolymers of vinyl acetate with 1% to 40% by weight of ethylene; copolymers of vinyl acetate with 1% to 40% by weight of ethylene and 1% to 50% by weight of one or more further comonomers from the group of the vinyl esters having 1 to 12 carbon atoms in the carboxylic acid residue such as vinyl propionate, vinyl laurate, vinyl esters of alpha-branched carboxylic acids having 5 to 13 carbon atoms such as VeoVa9R, VeoVa10R, VeoVa11R; copolymers of vinyl acetate, 1% to 40% by weight of ethylene and preferably 1% to 60% by weight of acrylates of unbranched or branched alcohols having 1 to 15 carbon atoms, especially n-butyl acrylate or 2-ethylhexyl acrylate; and copolymers with 30% to 75% by weight of vinyl acetate, 1% to 30% by weight of vinyl laurate or vinyl esters of an alpha-branched carboxylic acid having 5 to 13 carbon atoms, and 1% to 30% by weight of acrylates of unbranched or branched alcohols having 1 to 15 carbon atoms, especially n-butyl acrylate or 2-ethylhexyl acrylate, which may also contain 1% to 40% by weight of ethylene; and copolymers with vinyl acetate, 1% to 40% by weight of ethylene and 1% to 60% by weight of vinyl chloride; where each of the polymers may also contain the auxiliary monomers mentioned in the amounts mentioned, and the figures in % by weight add up to 100% by weight in each case.

Preference is also given to (meth)acrylic ester polymers, such as copolymers of n-butyl acrylate or 2-ethylhexyl acrylate or copolymers of methyl methacrylate with n-butyl acrylate and/or 2-ethylhexyl acrylate and optionally ethylene; styrene-acrylic ester copolymers with one or more monomers from the group of methyl acrylate, ethyl acrylate, propyl acrylate, n-butyl acrylate, 2-ethylhexyl acrylate; vinyl acetate-acrylic ester copolymers with one or more monomers from the group of methyl acrylate, ethyl acrylate, propyl acrylate, n-butyl acrylate, 2-ethylhexyl acrylate and optionally ethylene; and styrene-1,3-butadiene copolymers; where the polymers may also contain the auxiliary monomers mentioned in the amounts mentioned, and the figures in % by weight add up to 100% by weight in each case.

The monomer selection and the selection of the proportions by weight of the comonomers is made in such a way as to result generally in a glass transition temperature Tg of −50° C. to +50° C., preferably −30° C. to +40° C. The glass transition temperature Tg of the polymers can be determined in a known manner by means of differential scanning calorimetry (DSC). The Tg can also be calculated in advance as an approximation by means of the Fox equation. According to Fox T. G., Bull. Am. Physics Soc. 1, 3, page 123 (1956): $1/Tg=x1/Tg1+x2/Tg2+\ldots+xn/Tgn$, where xn is the mass fraction (% by wt./100) of monomer n, and Tgn is the glass transition temperature in kelvin of the homopolymer of the monomer n. Tg values for homopolymers are listed in Polymer Handbook 2nd Edition, J. Wiley & Sons, New York (1975).

The base polymers can be prepared by means of free-radically initiated polymerization of the ethylenically unsaturated monomers, as described, for example, in DE-A 102006050336, preferably by emulsion polymerization processes in an aqueous medium. Protective colloids used here may be the abovementioned water-soluble polymers c) or the hybrid copolymers of the invention.

The base polymers are generally obtained here in the form of aqueous dispersions. Emulsifier-stabilized dispersions have, for example, a mean particle size of 50 to 300 nm. Protective colloid-stabilized, especially hybrid copolymer-stabilized dispersions, have mean particle sizes of preferably 300 nm to 2000 nm and more preferably of 500 to 1500 nm. The particle sizes are determined in each case by means of a Beckmann Coulter particle size analyzer.

For preparation of the base polymers in the form of water-redispersible polymers, the aqueous dispersions, optionally after addition of drying aids, for example the abovementioned water-soluble polymers, preferably the hybrid copolymers of the invention, are dried. It is possible here to employ the methods described above for the drying of the hybrid copolymer dispersions. In general, the drying aid is used in a total amount of 3% to 30% by weight, based on the polymeric constituents of the dispersion. Preference is given to using 5% to 20% by weight based on the polymer content.

In the jetting operation for drying of aqueous polymer dispersions of the base polymers, a content of up to 3% by weight of antifoams, based on the base polymer, has been found to be favorable in many cases. The resultant polymer powder can be modified with an antiblocking agent (anticaking agent), preferably up to 30% by weight, especially up to 20% by weight or up to 15% by weight, based on the total weight of polymeric constituents. Suitable examples for this purpose are the abovementioned antiblocking agents.

To improve the performance properties, it is possible to add further additives in the course of drying. Further constituents of dispersion powder compositions present in preferred embodiments are, for example, pigments, fillers, foam stabilizers, hydrophobizing agents or cement plasticizers.

The base polymers in the form of water-redispersible powders have mean particle sizes of preferably 20 μm to 300 μm and more preferably of 40 μm to 200 μm (determination by means of Beckmann Coulter).

The hybrid copolymers can be introduced into the compositions comprising the base polymers in different ways. For instance, the hybrid copolymers can be initially charged wholly or partly prior to the initiation of the polymerization for preparation of the base polymers. Alternatively, the hybrid copolymers can be added wholly or partly during the polymerization in the preparation of the base polymers. It is likewise possible to mix a portion of the hybrid copolymers into the ethylenically unsaturated monomers prior to the initiation of the polymerization for preparation of the base polymers and to add the remaining portion of the hybrid copolymers during the polymerization of the ethylenically unsaturated monomers. Preferably, the hybrid copolymers are added to the corresponding polymer dispersion of the base polymers; in other words, base polymers are preferably first prepared by means of polymerization and then hybrid copolymers are added; in other words, the hybrid copolymers are preferably added after the polymerization for preparation of the base polymers. More preferably, the hybrid copolymers are added prior to the drying of the base polymer dispersions, for example in the form of a solution or a powder. To this end, generally one or more hybrid copolymers are added to the aqueous dispersions of the base polymers, in order subsequently to dry the mixtures thus obtained according to the processes detailed above.

In an alternative particularly preferred embodiment, one or more hybrid copolymers can also be added during the drying of the aqueous base polymer dispersions. Alternatively, the base polymers can also be mixed in the form of water-redispersible powders with one or more hybrid copolymers.

Preferably, the hybrid copolymers are used for preparation of the base polymers in the form of aqueous dispersions. More preferably, the hybrid copolymers are used for preparation of the base polymers in the form of water-redispersible powders, and in this case preferably introduced as a drying aid in the course of drying of the base polymer dispersions. The base polymers are thus hybrid copolymer-stabilized base polymers.

The aqueous dispersions or the water-redispersible powders of the base polymers preferably contain 1% to 50% by weight, more preferably 2% to 30% by weight, even more preferably 2% to 15% by weight and most preferably 2% to 10% by weight of hybrid copolymers, based on the dry weight of the aqueous dispersions or the water-redispersible powders of the base polymers.

Other protective colloids other than the hybrid copolymers, such as water-soluble polymers c), are present in the aqueous dispersions or the water-redispersible powders of the base polymers to an extent of preferably 1% to 30% by weight, more preferably 2% to 15% by weight and most preferably 2% to 10% by weight, based on the dry weight of the aqueous dispersions or of the water-redispersible powders of the base polymers. Alternatively, in the preparation of the base polymers in the form of aqueous dispersions or water-redispersible powders, it is also possible to completely dispense with the use of other protective colloids other than the hybrid copolymers.

The use of the hybrid copolymers of the invention as protective colloids leads to corresponding aqueous dispersions or polymer powders of base polymers having excellent storage stability. Polymer powders are additionally notable for high blocking resistance and excellent redispersibility in water. Surprisingly, these effects are achieved even in the case of smaller use amounts of hybrid copolymers than the use amounts customary for conventional protective colloids, even though the proportion of the water-soluble polymers c) in the hybrid copolymers is lower than in the conventional protective colloids.

Hybrid copolymers of the invention based on water-insoluble monomers a) lead, when used in accordance with the invention as protective colloids, to polymer dispersions and especially to polymer powders which are also storage-stable under moist or even moist and warm conditions. Corresponding polymer powders are also less hygroscopic compared to conventional dispersion powders. The high storage stability was particularly surprising specifically in the case of the hybrid copolymers containing units of water-insoluble monomers a), since polymers of water-insoluble monomers are regarded as completely unsuitable for use as a protective colloid. For that reason, it would have been expected that, in the case of hybrid copolymers containing water-insoluble monomers a), the use of greater amounts of protective colloids would be necessary than in the case of use of conventional protective colloids. Surprisingly, however, the opposite was found. The use of base polymers stabilized in accordance with the invention leads, in the case of hybrid copolymers based even on water-insoluble monomers a), to application products having high water resistance.

The use of ethylenically unsaturated, cationic monomers as monomers a) finally leads to hybrid copolymers which, when used in accordance with the invention as protective colloids, give particularly hydrolysis-stable products.

The hybrid copolymers of the invention have entirely different properties than conventional protective colloids. For instance, aqueous solutions of conventional protective colloids form complete films. In contrast, after drying of aqueous solutions of the hybrid copolymers, particles and hence no films are obtained. In addition, the hybrid copolymers in solid form are fully redispersible in water. The hybrid copolymers are also notable for ionic stability.

The base polymers of the invention in the form of aqueous dispersions or water-redispersible powders are especially suitable for use in construction chemical products. They can be used alone or in combination with conventional polymer dispersions or dispersion powders, optionally in conjunction with hydraulically setting binders such as cements (portland cement, aluminate cement, trass cement, foundry cement, magnesia cement, phosphate cement), gypsum and waterglass for the production of leveling compounds, construction adhesives, renders, spackling compounds, jointing mortars, sealing compounds or paints. Among construction adhesives, tile adhesives or integrated thermal insulation adhesives are preferred fields of use of the dispersion powder compositions. In addition, the hybrid copolymer-stabilized base polymers can be used for the production of moldings or as an additive for paints, adhesives, textiles or paper coatings.

Advantageously, construction materials containing base polymers stabilized with hybrid copolymer in accordance with the invention have advantageous processing properties, such as rheological properties or a desired open time.

The examples which follow serve to elucidate the invention in detail and should in no way be interpreted as a restriction.

The Brookfield viscosities were each determined with a Brookfield viscometer at 20 revolutions and 23° C. The particle sizes of the hybrid copolymers were determined by means of a Beckmann Coulter particle size analyzer.
Preparation of the Hybrid Copolymers:

EXAMPLE 1

A thermostated laboratory reactor of capacity 3.0 liters was initially charged under nitrogen with 2202 g of a 12.6% aqueous solution of the polyvinyl alcohol Mowiol 4-88 (trade name of Kuraray; Happier viscosity of 4 mPas, hydrolysis level 88) together with 1.11 g of potassium peroxodisulfate (KPS) and heated up to 80° C. while stirring. On attainment of 80° C., 277.5 g styrene were metered continuously into the reactor within 100 minutes.

30 minutes after the metered addition of styrene had ended, 20 g of KPS solution (3% in water) were added and further polymerization was effected at 80° C. for 90 minutes. Subsequently, the polymer dispersion was cooled to room temperature. The polymer dispersion had a solids content of 22.1% and a Brookfield viscosity of 780 mPa·s. The particle size was 75 nm.

EXAMPLE 2

As in example 1, except that, rather than 277.5 g of styrene, 249.5 g of styrene and additionally 140 g of a 20% aqueous solution of diallyldimethylammonium chloride (DADMAC) were metered in.

The polymer dispersion thus obtained had a solids content of 21.2% and a Brookfield viscosity of 520 mPa·s. The particle size was 70 nm.

EXAMPLE 3

A thermostated laboratory reactor of capacity 3.0 liters was initially charged under nitrogen with 2500 g of a 20.0% aqueous solution of the polyvinyl alcohol Mowiol 4-88, together with 1.3 g of potassium peroxodisulfate (KPS) and heated up to 80° C. while stirring. On attainment of 80° C., 163.0 g of a 50% aqueous solution of diallyldimethylammonium chloride (DADMAC) were metered continuously into the reactor within 80 minutes. 30 minutes after the metered addition of DADMAC had ended, 20 g of KPS solution (3% in water) were added and further polymerization was effected at 80° C. for 90 minutes. Subsequently, the polymer solution was cooled down to room temperature. The polymer dispersion had a solids content of 21.8% and a Brookfield viscosity of 208 mPa·s.

EXAMPLE 4

As in example 3, except that, in addition to Mowiol 4-88, Mowiol 13-88 (trade name of Kuraray; Höpler viscosity of 13 mPas, hydrolysis level 88) was also used additionally and the hybrid copolymer obtained after the polymerization was based on 42% by weight of Mowiol 4-88 and 28% by weight of Mowiol 13-88, and also 30% by weight of styrene.

The polymer dispersion thus obtained had a solids content of 21.9% and a Brookfield viscosity of 2200 mPa·s. The particle size was 78 nm.

EXAMPLE 5

As in example 3, except that, rather than the Mowiol 4-88 polyvinyl alcohol solution, a fully hydrolyzed cationic polyvinyl alcohol having a Höpler viscosity of 4.1 mPa·s was used. The fully hydrolyzed cationic polyvinyl alcohol was prepared as described in US 2006/0264572 A1, by copolymerizing vinyl acetate with 3% by weight of diallyldimethylammonium chloride (DADMAC) and then hydrolyzing.

The polymer dispersion thus obtained had a solids content of 22.3% and a Brookfield viscosity of 980 mPa·s. The particle size was 79 nm.

EXAMPLE 6

As in example 3, except that, rather than the Mowiol 4-88 polyvinyl alcohol solution, a fully hydrolyzed anionic polyvinyl alcohol having a Höpler viscosity of 4.0 mPa·s was used. The fully hydrolyzed anionic polyvinyl alcohol was prepared as described in WO 2006/122705 A1, by copolymerizing vinyl acetate with 3% by weight of 2-methyl-2-propene-1-sulfonic acid sodium salt and hydrolyzing.

The polymer dispersion thus obtained had a solids content of 22.0% and a Brookfield viscosity of 900 mPa·s. The particle size was 74 nm.

EXAMPLE 7

As in example 1, except that, rather than 277.5 g of styrene, 269.2 g of styrene and additionally 8.3 g of vinyltriethoxysilane (GENIOSIL GF 56, trade name of Wacker Chemie) were metered in.

The polymer dispersion thus obtained had a solids content of 21.9% and a Brookfield viscosity of 890 mPa·s. The particle size was 88 nm.

EXAMPLE 8

Added to the 2000 g of polymer dispersion obtained in example 7, at 50° C., were 195 g of silica sol (Bindzil 2040, solids content of 41%), and then the mixture was stirred at this temperature for 3 hours.

The polymer dispersion thus obtained had a solids content of 23.5%. The particle size was 98 nm.

Redispersion Characteristics of Hybrid Copolymers After Film Formation:

The polymer dispersions of examples 1 to 8 were each used to produce films of thickness 0.2 mm on glass plates, and these were dried at room temperature for 24 hours and at 105° C. for 15 minutes.

Subsequently, the redispersibility was tested by using a pipette to apply one water droplet in each case at room temperature to a homogeneous site on the film to be tested. After a contact time of 60 seconds at room temperature, the water droplet was rubbed with the fingertip on the same site until the glass plate at this site was film-free, the film fell to pieces or the film remained completely intact.

The redispersibility of the hybrid copolymer films was assessed by the following assessment scheme:

Mark 1: film can be completely redispersed immediately by gentle rubbing or is redispersed of its own accord;
Mark 2: film can be redispersed by rubbing, barely any pieces of film formed;
Mark 3: film can be redispersed only by vigorous rubbing with formation of pieces of film;
Mark 4: film cannot be redispersed even by prolonged vigorous rubbing, and instead falls to pieces.

The results of the testing are listed in table 1.

TABLE 1

| Hybrid copolymer | Assessment of the redispersibility of the hybrid copolymer films |
|---|---|
| Ex. 1 | 1 |
| Ex. 2 | 1 |
| Ex. 3 | 1 |
| Ex. 4 | 1 |
| Ex. 5 | 1 |
| Ex. 6 | 1 |
| Ex. 7 | 2 |
| Ex. 8 | 2 |

Production of the Redispersible Powders (DPPs) by Means of Spray-drying:

Redispersible powders (DPPs) were produced using an aqueous polyvinyl alcohol-stabilized ethylene-vinyl acetate copolymer dispersion (base dispersion) having a glass transition temperature Tg of −7° C. and a solids content of 53%. The polyvinyl alcohol present therein had a Happier viscosity of 5 mPa·s and a hydrolysis level of 88 mol %. The drying aid used was the auxiliary specified in table 2 in the amount specified therein.

The particular polymer dispersion was sprayed by means of a two-phase nozzle. The jetting component was 4 bar compressed air; the droplets formed were dried in cocurrent with air heated to 125° C. The dry polymer powder was admixed with 3% by weight commercial antiblocking agent (kaolin).

TABLE 2

| DPP | Auxiliary | Amount of auxiliary [%][b] | Blocking test [mark] | Processibility |
|---|---|---|---|---|
| V-DPP1 | M 04/88[a] | 10.0% | 2 | 10 min |
| V-DPP2 | M 04/88[a] | 7.0% | 4 | 20 min |
| DPP-1 | Ex. 1 | 7.0% | 2 | 1.0 hour |
| DPP-2 | Ex. 2 | 7.0% | 3 | 1.5 hours |
| DPP-3 | Ex. 3 | 7.0% | 1 | 2.0 hours |
| DPP-4 | Ex. 4 | 7.0% | 2 | 1.0 hour |
| DPP-5 | Ex. 5 | 7.0% | 1 | 1.5 hours |
| DPP-6 | Ex. 6 | 7.0% | 1 | 1.5 hours |
| DPP-7 | Ex. 7 | 7.0% | 2 | 1.0 hour |
| DPP-8 | Ex. 8 | 7.0% | 2 | 1.0 hour |

[a]Mowiol 04/88 (trade name of Kuraray): polyvinyl alcohol having a Höppler viscosity of 4 mPas, a hydrolysis level of 88 mol %; used as aqueous solution having a solids content of 20%;
[b]proportion of auxiliary, based on the dry weight of the polymer powder.

Determination of Blocking Resistance of the Powders (Blocking Test):

To determine the blocking resistance, the particular dispersion powder was introduced into an iron tube (diameter: 5 cm) having a screw thread and then subjected to load with a metal ram (weight: 3 kg). After loading, the material was stored in a drying cabinet at 50° C. for 16 hours. After cooling to room temperature, the powder was removed from the tube and the blocking stability was determined qualitatively by crushing the powder. The blocking stability was classified as follows:

1=very good blocking stability;
2=good blocking stability;
3=satisfactory blocking stability;
4=not blocking-stable, powder no longer free-flowing after crushing.

The test results are compiled in table 2 in the "Blocking test" column.

Determination of Cement Stability (Processibility):

A cement mixture of the following recipe was made up:

| | |
|---|---|
| portland cement | 82.5 g |
| calcite (CaCO$_3$) 10-40 mm | 75.0 g |
| quartz sand 200-500 mm | 75.0 g |
| optionally dispersion powder (DPP) | 15.0 g |
| optionally M 04/88 polyvinyl alcohol | 15.0 g |
| water | 85.0 g |

The processibility of the cement mixture was observed and assessed qualitatively over a period of two hours. The "Processibility" column in table 2 states the period within which the respective cement mixture had good processibility. The test results are given in table 2 in the "Processibility" column.

Production and Testing of Mortars:

The constituents of the particular mortar listed in table 3 were mixed in the amounts specified therein with water at room temperature.

For the testing, the particular mortar was applied as a reinforcing mortar in a layer thickness of 4 mm at room temperature to EPS (expanded polystyrene) sheets.

After hardening of the reinforcing mortar layer and storage of the test specimens, the tensile bond strength and the tear-out on EPS sheets were determined to test method DIN 18555-6. Storage was under the following conditions:
 14 days under standard climatic conditions at 23° C. and 50% relative humidity (14d SC);
 12 days under standard climatic conditions and then two days of water exposure at 23° C. (12d SC+2d $H_2O$).

The test results are compiled in table 3. The results show that the mortars modified in accordance with the invention give better bond strength values and EPS tear-out than the mortars of the comparative examples (C-mortar 1 and C-mortar 2).

TABLE 3

Production and testing of the mortars:

| | Mortar 1 | Mortar 2 | Mortar 3 | Mortar 4 | Mortar 5 | Mortar 6 | Mortar 7 | Mortar 8 | C-Mortar 1 | C-Mortar 2 |
|---|---|---|---|---|---|---|---|---|---|---|
| Constituents [pts. by wt.] | | | | | | | | | | |
| White cement 42.5 [pts. by wt.] | 130 | 130 | 130 | 130 | 130 | 130 | 130 | 130 | 130 | 130 |
| Refined hydrated lime [pts. by wt.] | 40 | 40 | 40 | 40 | 40 | 40 | 40 | 40 | 40 | 40 |
| Quartz sand AKW 9a [pts. by wt.] | 520 | 520 | 520 | 520 | 520 | 520 | 520 | 520 | 520 | 520 |
| Calcium carbonate MHS [pts. by wt.] | 283.5 | 283.5 | 283.5 | 283.5 | 283.5 | 283.5 | 283.5 | 283.5 | 283.5 | 283.5 |
| Cellulose ether [pts. by wt.] | 1.5 | 1.5 | 1.5 | 1.5 | 1.5 | 1.5 | 1.5 | 1.5 | 1.5 | 1.5 |
| DPP-1 [pts. by wt.] | 25 | | | | | | | | | |
| DPP-2 [pts. by wt.] | | 25 | | | | | | | | |
| DPP-3 [pts. by wt.] | | | 25 | | | | | | | |
| DPP-4 [pts. by wt.] | | | | 25 | | | | | | |
| DPP-5 [pts. by wt.] | | | | | 25 | | | | | |
| DPP-6 [pts. by wt.] | | | | | | 25 | | | | |
| DPP-7 [pts. by wt.] | | | | | | | 25 | | | |
| DPP-8 [pts. by wt.] | | | | | | | | 25 | | |
| V-DPP1 [pts. by wt.] | | | | | | | | | 25 | |
| V-DPP2 [pts. by wt.] | | | | | | | | | | 25 |
| Water [ml/1 kg of dry mortar] | 250 | 250 | 250 | 250 | 250 | 250 | 250 | 250 | 250 | 250 |
| Test results: | | | | | | | | | | |
| Bond strength (14d SC) [N/mm$^2$] | 0.13 | 0.13 | 0.12 | 0.13 | 0.12 | 0.12 | 0.12 | 0.13 | 0.11 | 0.10 |
| Bond strength (12d SC + 2d $H_2O$) [N/mm$^2$] | 0.10 | 0.10 | 0.09 | 0.10 | 0.09 | 0.09 | 0.09 | 0.10 | 0.08 | 0.07 |
| EPS tear-out (14d SC) [%] | 90 | 100 | 95 | 100 | 95 | 90 | 95 | 100 | 80 | 70 |
| EPS tear-out (12d SC + 2d $H_2O$) [%] | 75 | 85 | 80 | 85 | 75 | 75 | 80 | 85 | 60 | 50 |

The invention claimed is:

1. A process for preparing a water-redispersible polymer powder composition, comprising:
 A) providing a first aqueous dispersion comprising particles of at least one base polymer comprising polymerized ethylenically unsaturated compounds, and
 B) adding to the aqueous dispersion A), at least one hybrid copolymer protective colloid as a drying aid to form a second aqueous dispesion comprising the base polymer and the hybrid copolymer protective colloid, and
 C) drying the second aqueous dispersion from step B) to obtain a water-redispersible polymer powder,
wherein the hybrid copolymer protective colloid is obtained by
 a) free-radically initiated polymerizing
  a)i) one or more ethylenically unsaturated monomers selected from the group consisting of vinyl acetate, vinyl propionate, vinyl butyrate, vinyl 2-ethylhexanoate, vinyl laurate, 1-methylvinyl acetate, vinyl pivalate, vinyl esters of alpha-branched monocarboxylic acids having 5 to 13 carbon atoms, methyl acrylate, methyl methacrylate, ethyl acrylate, ethyl methacrylate, propyl acrylate, propyl methacrylate, butyl acrylate, butyl methacrylate, 2-ethylhexyl acrylate, norbornyl acrylate, lauryl acrylate, lauryl methacrylate, stearyl acrylate, stearyl methacrylate, 2-propylheptyl acrylate, isotridecyl methacrylate, dihydrodicyclopentadienyl acrylate, ethylene, propylene, 1,3-butadiene, styrene, methylstyrene, vinyltoluene, vinyl chloride, 2-dimethylaminoethyl methacrylate, 3-dimethylaminopropyl-methacrylamide, N-(1,1-dimethyl-3-dimethylaminopropyl)-acrylamide, N-(1,1-dimethyl-3-dimethylaminobutyl)-acrylamide, N-(1-methyl-1,3-diphenyl-3-diethylamino-propyl)methacrylamide, 1-vinylimidazole, 1-vinyl-2-methylimidazole, 1-vinyl-2-ethylimidazole, 1-vinyl-2-phenylimidazole, 1-vinyl-2,3-dimethylimidazole, 1-vinly-2,4,5-trimethylimidazole, diallyldiethylammonium chloride, (3-methacryloyloxy)propyltrimethylammonium chloride, (3-methacryloyloxy)ethyltrimethylammonium chloride, (3-methacrylamido)propyltrimethylammonium chloride, trimethyl-3-(1-acrylamido-1,1-dimethyl-propyl)ammonium chloride, trimethyl-3-(1-acrylamido-1,1-dimethylbutyl)ammonium chloride, dimethylacrylamido-propyl-4-trimethylammoniobutenyl-2-ammonium chloride, 2-arylamidomethoxy)ethyl-trimethylammonium chloride, and diallyldimethylammonium chloride, and
  a)ii) optionally, one or more silanes selected from the group consisting of ethylenically unsaturated silanes and mercaptosilanes,
 b) in the presence of one or more water-soluble polymers, wherein the water-soluble polymers are present to an extent of 20% to 95% by weight, based on the total weight of water-soluble polymers and ethylenically unsaturated monomers used in the polymerization, and,
 c) optionally, condensing one or more silicon compounds of the formula $$(RO)_n SiR^1{}_{4-n} \qquad (1),$$

or one or more condensation products of silicon compounds of the formula (1), where
R is an optionally substituted alkyl radical, having 1 to 20 carbon atoms, an aryl radical, or hydrogen,
$R^1$ optionally substituted hydrocarbyl radical or hydrogen, and
n is from 1 to 4.

2. The process for preparing a water-redispersible polymer powder composition of claim 1, wherein the ethylenically unsaturated compounds used to form the base polymer particles of A) include one or more water-insoluble ethylenically unsaturated monomers whose homopolymers have a solubility in water of <10 g/l under standard conditions according to DIN50014.

3. The process for preparing a water-redispersible polymer powder composition of claim 1, wherein the ethylenically unsaturated compounds used to form the base polymer particles of A) include one or more ethylenically unsaturated cationic monomers.

4. The process for preparing a water-redispersible polymer powder composition of claim 1, wherein the one or more ethylenically unsaturated silanes a)ii) include one or more ethylenically unsaturated silicon compounds of the formula $$R^3\text{—SiR}^2{}_{0-2}(OR^4)_{1-3} \quad (2)$$

where
$R^2$ is a $C_1$- to $C_3$-alkyl radical, $C_1$- to $C_3$-alkoxy radical or halogen,
$R^3$ is —$CH_2$=$CR^3$—$(CH_2)_{0-1}$ or $CH_2$=$CR^5CO_2(CH_2)_{1-3}$,
$R^4$ is an unbranched or branched, optionally substituted alkyl radical having 1 to 12 carbon atoms or an acyl radical having 2 to 12 carbon atoms, where $R^4$ is optionally interrupted by an ether group, and
$R^5$ is H or $CH_3$.

5. The process for preparing a water-redispersible polymer powder composition of claim 1, wherein the one or more water-soluble polymers b) are selected from the group consisting of polysaccharides in water-soluble form, proteins, lignosulfonates, formaldehydesulfonates, polymers comprising units of vinyl alcohol, vinylpyrrolidone, vinyl acetal, ethylenically unsaturated carboxylic acid, acrylamide, vinylsulfonic acid, ethylenically unsaturated amine, unsaturated ammonium compounds, and mixtures thereof.

6. The process for preparing a water-redispersible polymer powder composition of claim 1, wherein the one or more water-soluble polymers b) include one or more polyvinyl alcohols.

7. The process for preparing a water-redispersible polymer powder composition of claim 1, wherein the one or more water soluble polymers b) include one or more hydrophobically modified polyvinyl alcohols, cationic polyvinyl alcohols or anionic polyvinyl alcohols.

8. The process for preparing a water-redispersible polymer powder composition of claim 1, wherein the at least one hybrid copolymer protective colloid of step B) is prepared using 5% by weight to 80% by weight of monomers a)i), based on the total weight of water-soluble polymers b) and ethylenically unsaturated monomers a)i).

9. The process for preparing a water-redispersible polymer powder composition of claim 1, wherein in the preparation of the at least one hybrid copolymer, ≥50% by weight of the total amount of water-soluble polymers b) is initially charged, or is metered in prior to a time at which nnot more than 60% by weight of the total amounts of ethylenically unsaturated monomers a)i) and optional silanes a)ii) have been charged.

10. The process for preparing a water-redispersible polymer powder composition of claim 1, wherein the at least one hybrid copolymer is prepared by initially charging 0% to 20% by weight of the ethylenically unsaturated monomers a)i) and the optional silanes a)ii), based on the total weight of the amount of ethylenically unsaturated monomers a)i) and silanes a)ii), prior to the initiation of the polymerization.

11. The process for preparing a water-redispersible polymer powder composition of claim 1, wherein the at least one base polymer comprises polymerized moieties derived from one or more ethylenically unsaturated monomers selected from the group consisting of vinyl esters of carboxylic acids having 1 to 15 carbon atoms, methacrylates or acrylates of branched or unbranched alcohols having 1 to 15 carbon atoms, olefins, dienes, vinylaromatics, vinyl halides, and ethylenically unsaturated silanes.

12. The process for preparing a water-redispersible polymer powder composition of claim 1, wherein the at least one base polymer is prepared by free-radically initiated polymerization of ethylenically unsaturated monomers; and
at least one hybrid copolymer protective colloid is added after the preparation of the base polymers; or
at least one hybrid copolymer protective colloid is added before, during or after the drying of aqueous dispersions of base polymers.

13. The process for preparing a water-redispersible polymer powder composition of claim 1, further comprising adding the water-redispersible polymer powder obtained in step C) to components of a construction chemical product.

14. The process for preparing a water-redispersible polymer powder composition of claim 1, further comprising adding the water-redispersible polymer powder obtained in step C) to a paint, adhesive, textile or paper coating composition.

* * * * *

UNITED STATES PATENT AND TRADEMARK OFFICE
CERTIFICATE OF CORRECTION

PATENT NO. : 9,580,591 B2  
APPLICATION NO. : 14/651619  
DATED : February 28, 2017  
INVENTOR(S) : Hashemzadeh Page 1 of 1

It is certified that error appears in the above-identified patent and that said Letters Patent is hereby corrected as shown below:

In the Claims

Column 21, Line 53, Claim 1:  
After "second aqueous"  
Delete "dispesion" and  
Insert -- dispersion --.

Signed and Sealed this  
Twenty-seventh Day of June, 2017

Joseph Matal  
*Performing the Functions and Duties of the*  
*Under Secretary of Commerce for Intellectual Property and*  
*Director of the United States Patent and Trademark Office*